US008276682B2

(12) United States Patent
Hall

(10) Patent No.: US 8,276,682 B2
(45) Date of Patent: Oct. 2, 2012

(54) CONTINUOUS STROKE PNEUMATIC TOOL WITH BALL VALVE

(75) Inventor: Andrew Hall, Huntington Beach, CA (US)

(73) Assignee: American Pneumatic Tools, Inc., Gardena, CA (US)

( * ) Notice: Subject to any disclaimer, the term of this patent is extended or adjusted under 35 U.S.C. 154(b) by 0 days.

(21) Appl. No.: 12/024,603

(22) Filed: Feb. 1, 2008

(65) Prior Publication Data

US 2008/0185550 A1    Aug. 7, 2008

Related U.S. Application Data

(60) Provisional application No. 60/899,768, filed on Feb. 5, 2007.

(51) Int. Cl.
*B23Q 5/033* (2006.01)

(52) U.S. Cl. .............................. 173/13; 173/17; 251/174

(58) Field of Classification Search .................... 173/13, 173/17, 169, 66, 93; 91/316, 317; 137/240, 137/605; 251/174, 205
See application file for complete search history.

(56) References Cited

U.S. PATENT DOCUMENTS

| | | | |
|---|---|---|---|
| 124,070 A | 9/1917 | Haeseller | |
| 1,240,709 A * | 9/1917 | Haeseler | 173/137 |
| 1,447,234 A * | 3/1923 | Carroll | 175/318 |
| 161,317 A | 1/1927 | Jasper | |
| 1,634,780 A * | 7/1927 | Haeseler | 91/317 |
| 1,913,003 A * | 6/1933 | Shaff | 173/222 |
| 2,334,403 A * | 11/1943 | Forss | 91/316 |
| 2,559,012 A * | 7/1951 | Davis et al. | 173/121 |
| 3,096,825 A * | 7/1963 | Clark, Jr. | 166/325 |
| 3,896,886 A * | 7/1975 | Roscoe, Jr. | 173/17 |
| 3,944,003 A * | 3/1976 | Curington | 173/73 |
| 3,970,106 A * | 7/1976 | Harris | 137/843 |
| 4,273,310 A * | 6/1981 | Ginzler | 251/211 |
| 4,416,338 A * | 11/1983 | Nelson et al. | 173/206 |
| 4,466,851 A * | 8/1984 | Hoffman | 156/344 |
| 4,489,743 A * | 12/1984 | Canalizo et al. | 137/155 |
| 4,888,974 A * | 12/1989 | Mandell | 29/243.523 |
| 526,758 A | 12/1993 | Jones | |
| 5,267,585 A * | 12/1993 | Jones | 137/240 |
| 5,400,860 A * | 3/1995 | Best et al. | 173/162.2 |
| 5,645,132 A * | 7/1997 | Åsberg | 175/318 |
| 5,930,899 A * | 8/1999 | Hartman et al. | 30/168 |

FOREIGN PATENT DOCUMENTS

EP    1203907    5/2002

* cited by examiner

*Primary Examiner* — Stephen F Gerrity
*Assistant Examiner* — Nathaniel Chukwurah
(74) *Attorney, Agent, or Firm* — Lance M. Pritikin; Bruce A. Jagger

(57) ABSTRACT

A ball valve assembly for use as a control valve for controlling the flow of gas through a continuous stroke pneumatic tool. The valving element is generally spherical and non-magnetizable. The generally spherical valving element is loosely confined between two concave generally conical surfaces, which are provided on valve seat members. The concave generally conical surfaces are opposed to one another to define a valve chamber therebetween. Sufficient clearance is provided so the generally spherical valving element is free to roll and tumble as it moves in the valve chamber between the concave generally conical surfaces. This allows the ball valve assembly to be self purging of excess lubricant, dust, and the like. Wear is distributed over the entire generally spherical surface of the valving element. The loose confinement is also sufficient to provide a relatively large cross-section of gas passageway through the control valve assembly. The two valve seat members are suitably ported to permit the ball valve assembly to be used as a drop-in replacement for prior pneumatic tool control valves.

13 Claims, 6 Drawing Sheets

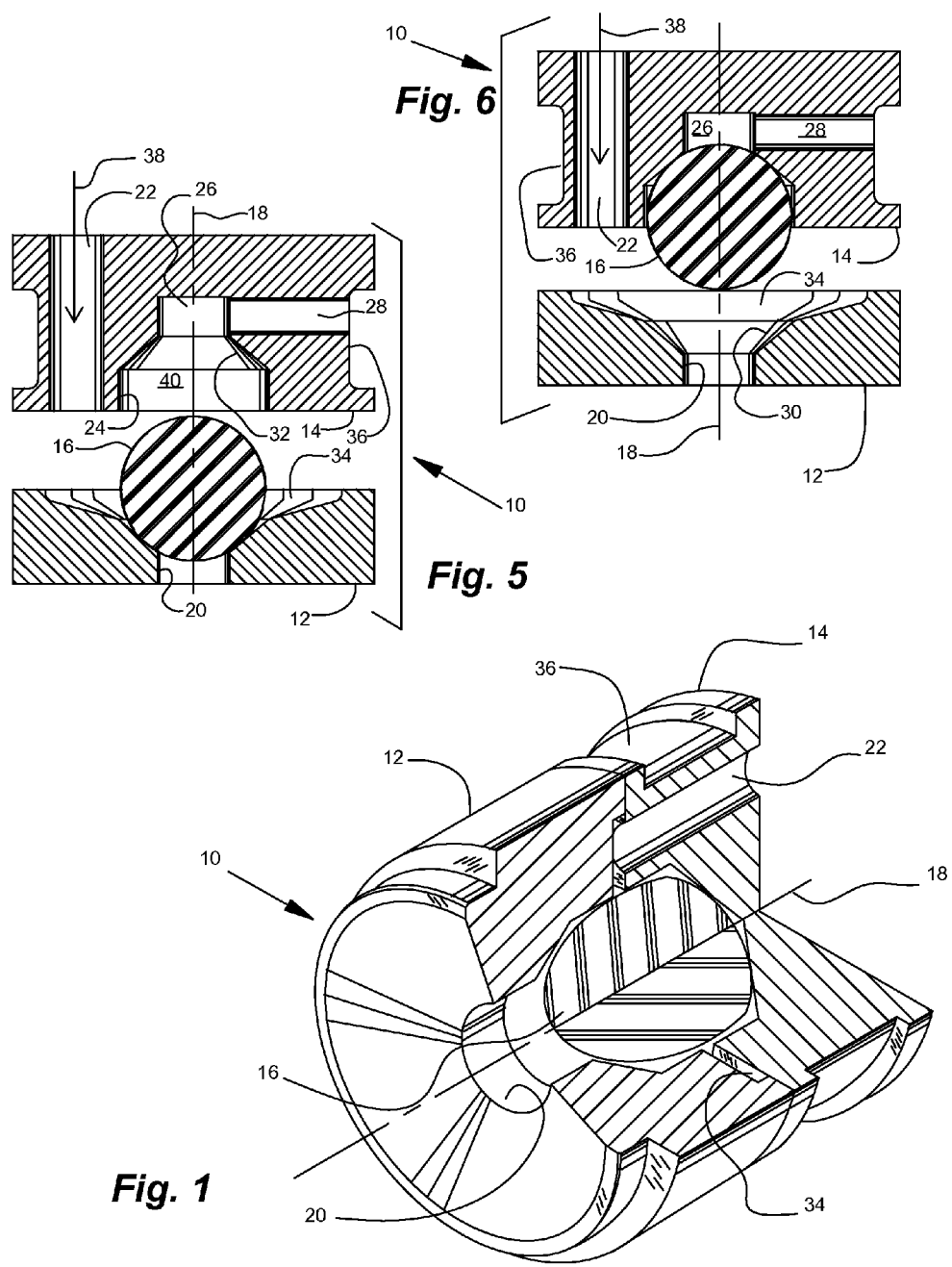

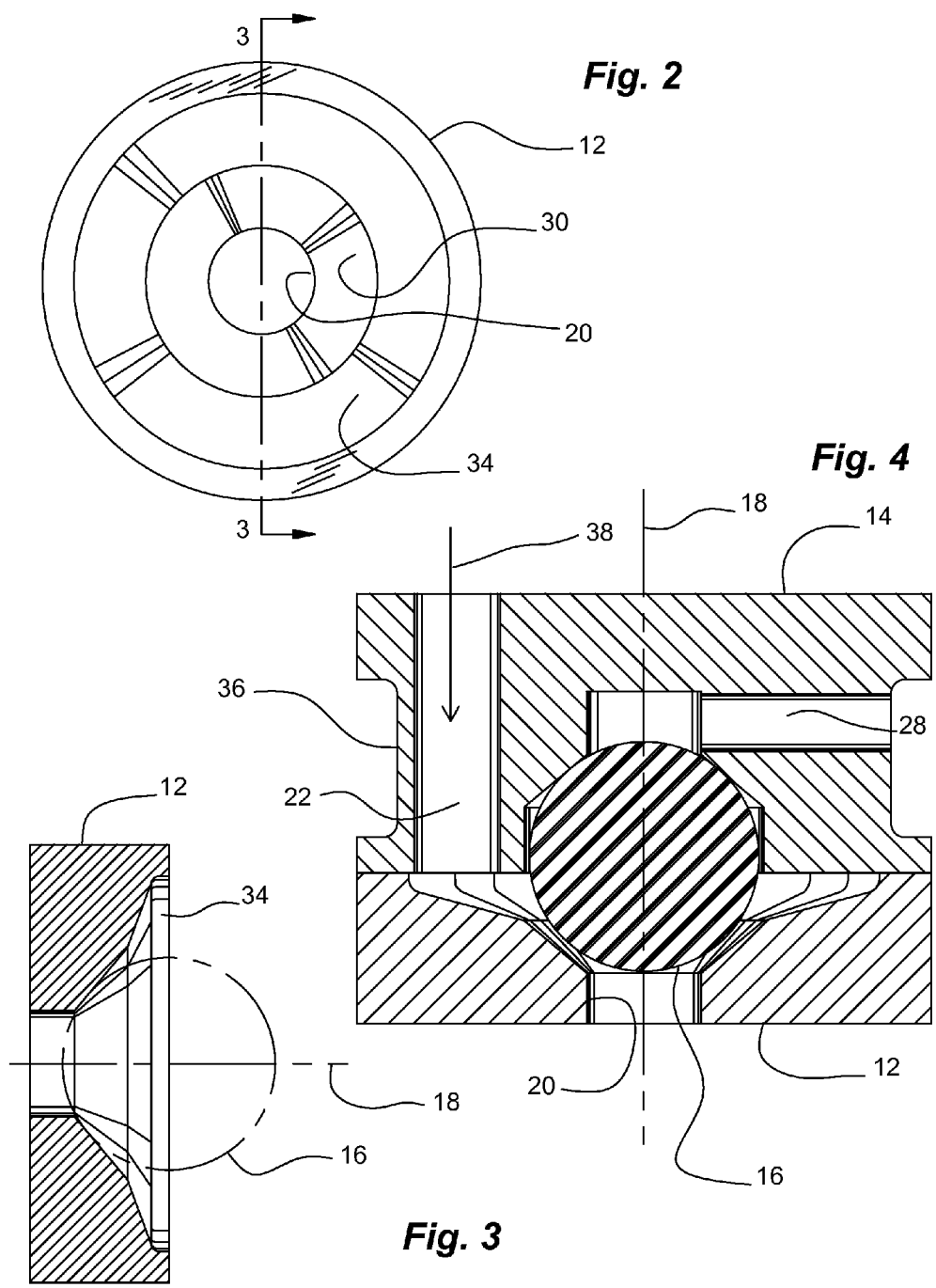

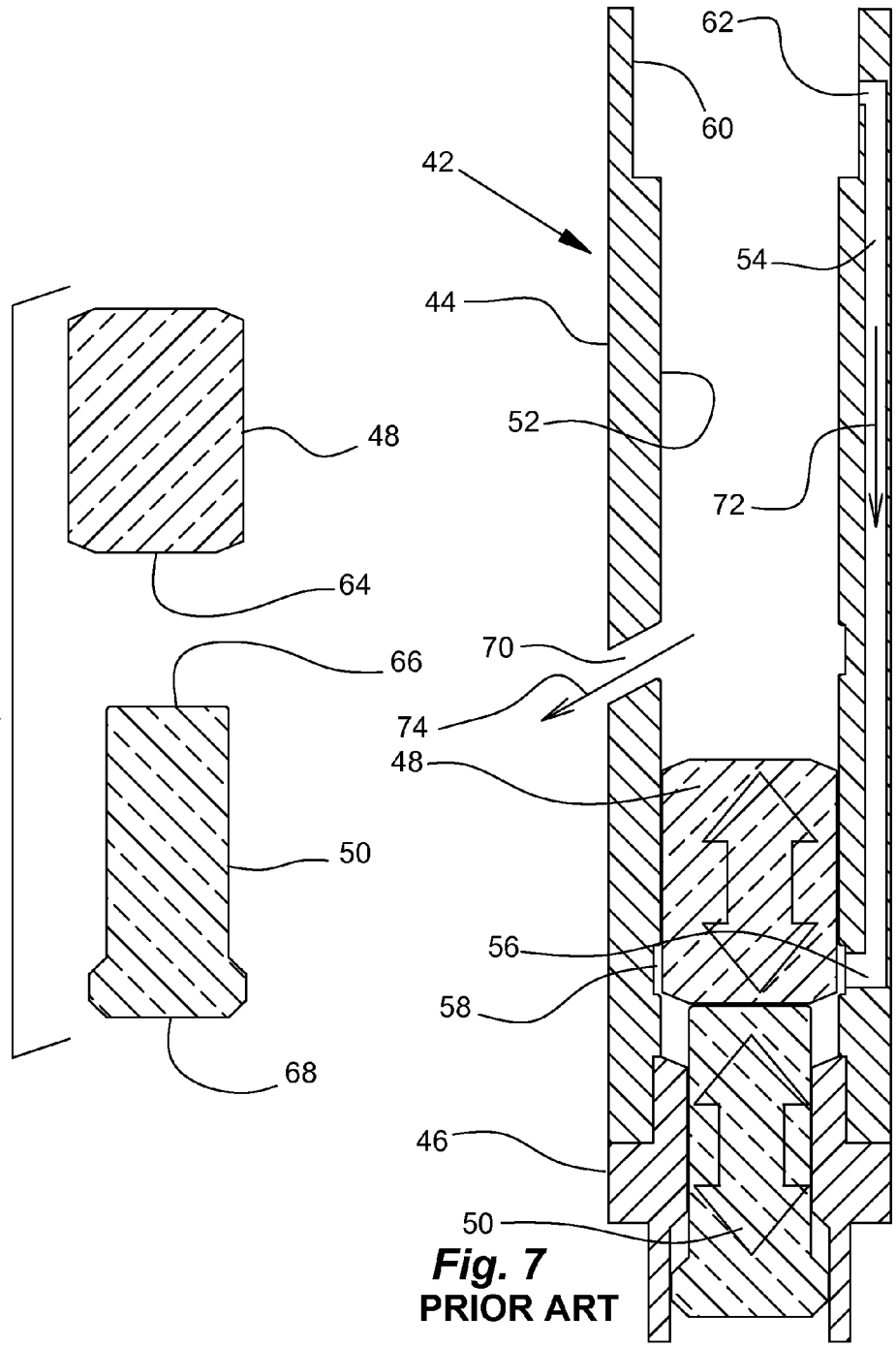

CONTINUOUS STROKE PNEUMATIC TOOL WITH BALL VALVE

RELATED APPLICATIONS

This application claims the benefit of U.S. Provisional Application No. 60/899,768, filed Feb. 5, 2007.

BACKGROUND OF THE INVENTION

1. Field of the Invention

The present invention relates in general to valving methods and devices for controlling the flow of air in a pneumatic tool, and, more particularly, embodiments of the present invention relate to continuous stroke pneumatic tools in which a ball valve is incorporated in their pneumatic circuits.

2. Description of the Prior Art

Typical continuous stroke pneumatic tools include, for example, jackhammers, impact wrenches, scrappers, files, rasps, riveting guns, rotary hammers, chipping hammers, and the like. These tools generally incorporate a pneumatic circuit, which allows air or other pressurized gas to cause the tools to perform their intended function.

Pneumatic circuits in continuous stroke pneumatic tools typically include a valving mechanism to control the flow of pressurized gas (typically air) through the tool. Such pneumatic circuits typically operate so that pressurized gas flows in one direction through the circuit to cause a free floating piston to move within a cylinder in one direction during a power stroke. At about the limit of the piston's movement at the end of the power stroke, the piston strikes a tappet member. The tappet member causes the pneumatic tool to deliver a blow to a bit or other attachment that performs the intended work. Also, at the end of the power stroke, the valve is activated and the flow of gas is reversed. The piston then moves through a return stroke. At the end of the return stroke, the valve is again activated to reverse the flow of gas so that another power stroke may be performed. So long as pressurized gas continues to be supplied to the pneumatic circuit, the pneumatic circuit operates continuously driving the piston between return and power strokes. Some prior pneumatic tools provide an operator with the option of operating the tool in either a continuous stroke or intermittent stroke mode. Prior valving expedients generally involved the use of machined close tolerance metal parts. Such prior expedients were not without their shortcomings. Those concerned with these matters in this art recognized the need for improvement.

A major shortcoming of typical prior art devices and methods is that the required close tolerances within the metal valves made them expensive to make and maintain, and limited their reliability. The prior valves generally could not self-compensate for wear or blockages, so frequent maintenance and replacement were required. The machined parts occasionally became self magnetized, which interfered with the operation of the valves. The steel that was typically used for the valve components was subject to corrosion. Any dirt, metallic particles, or other debris tended to interfere with the operation of the valves. Even excessive lubricant could cause the valve parts to become sticky and move erratically. Remedying such fouling required disassembly, cleaning, and reassembly of the valves, because the prior valves were generally not self purging. Pneumatic tools must often operate in very harsh weather. Any moisture in the valve components tended to cause the valves to freeze or otherwise malfunction.

Previous standard designs included, for example, shuttle, plate, ball and flapper type valves, and were generally of all-metallic construction. These metallic components often required heat treatment and close-tolerance machining for them to function efficiently. In general, these prior valves were prone to fail due to conditions frequently encountered during use.

Moisture is always present in any compressed air system. The tight tolerances between diameters and faces of prior devices often trapped this moisture, particularly when the tool was idle for a while. This frequently caused the prior valves to stick in one position. Due to the moisture present in compressed air systems, in severe weather conditions or prolonged continuous operation of these types of tools, it was not unusual for the water present to freeze and prevent the tool from functioning.

Sometimes similar metals tend to magnetize themselves as the components rub together, giving erratic operation of the valve. There was a long felt need for a solution to this problem.

Because of the tight dimensions between diameters and faces on standard prior art valves, gaps of only a few thousandths of an inch were required with tolerances in the order of plus or minus one or two thousandth of an inch. These gaps were susceptible to causing malfunctions when any debris was ingested into the tool. This caused the valve to jam or leak air past the surfaces that are not closed.

If too much lubricating oil was administered to the prior tools, the excess oil tended to "glue" close fitting moving parts together, especially at lower temperatures.

Metal to metal contact eventually caused wear on one or more components due to the friction between parts. Eventually the prior parts wore to the point where the tool would not operate efficiently. The same surfaces in the prior valves were in contact with each other all the time, inducing wear at specific locations.

Standard prior valves were normally of metallic materials that required heat treatment to enhance their wear capabilities. These valves often required expensive manufacturing operations, such as grinding, to achieve the tight tolerances that were required.

There are many pneumatic tools in use throughout the world. There was a recognized need for a control valve kit that would allow the end users of these tools to retrofit the tools with new and improved control valves without any machining or other difficult to perform operations. The need was for a retrofit valve kit that could be installed using nothing more than conventional hand tools.

The pneumatic tool industry has long recognized the need for better pneumatic tool control valves. In response to such needs, this industry has made a number of attempts to resolve the problems of reliability, and expense of making and maintaining prior pneumatic control valves.

One such attempt is reflected in Haeseller U.S. Pat. Nos. 1,240,708, and 1,240,709, each of which is hereby incorporated by reference herein as though fully set forth hereat. A valve cage is mounted in a valve cage pocket on the side of the casing of a pneumatic percussive tool. A ball in the valve cage rolls back and forth in a chamber between two ports. The ports are in the side of the chamber, not at its opposed ends. A tight seal would require the ball to move laterally into the side ports. Without a tight seal, the valve would be inefficient or inoperative depending on how much leakage occurs. The ball and valve cage appear to be metallic. Hartman et al. U.S. Pat. No. 5,930,899, which is hereby incorporated by reference herein as though fully set forth hereat, discloses a pneumatic scraping tool wherein valving is accomplished by a ball that moves back and forth in a cylindrical bore. At one end of its travel the ball seats on an o-ring that is generally concentric with the longitudinal axis of the cylindrical bore. There is no o-ring at the other end of the ball's travel.

Still other attempts are reflected in other prior patents, including, for example, Hartman et al. U.S. Pat. No. 5,930,899 (ball valve in which a ball is seated at one end of its travel by contact with an O-ring, but other ports appear to be sealed by metal to metal contact with the moveable ball); Koudelka, U.S. Pat. No. 5,183,121 (spring loaded ball engages a plastic seat); Curington U.S. Pat. No. 4,146,097 (a check valve ball engages a conical seat at one end of its travel, with the ball and seat apparently being metal); Hoffman U.S. Pat. No. 4,466,851 (a ball rolls back and forth between seats with both the ball and the seats apparently being metal); and Nelson et al. U.S. Pat. No. 4,416,338 (what appears to be a metal ball rolls between the ends of a chamber, one end of which includes an O-ring seat for the ball), each of which is hereby incorporated herein by reference as though fully set forth hereat.

BRIEF SUMMARY OF THE INVENTION

Embodiments have been developed in response to the current state of the art, and in particular, in response to these and other problems and needs that have not been fully or completely solved by currently available control valves for pneumatic tools. Embodiments effectively resolve at least the problems and shortcomings identified herein. Embodiments are particularly suitable for use as control valve replacement kits for existing pneumatic tools.

Continuous stroke pneumatic tools (FIGS. 7-12) generally comprise a body member with a longitudinal axis and a generally cylindrical bore therein. The generally cylindrical bore has generally axially opposed first and second ends. A piston element is slidably received in the generally cylindrical bore for free-floating movement generally along the longitudinal axis of the cylindrical bore. The tool has a power stroke during which the piston element moves towards the second end, and a return stroke during which the piston element moves toward the first end. A tappet element is mounted generally at the second end in such a position that it is impacted by the piston element at approximately the end of the power stroke. A pneumatic circuit is associated with the body member. The pneumatic circuit generally includes a supply conduit that is adapted to being connected to a continuous source of pressurized gas. An on-off valve is flow controllingly associated with the supply conduit. A control valve assembly is mounted generally in the body member at approximately the first end. Present embodiments of a control valve assembly comprise a ball valve assembly mounted generally in the body member at approximately the first end (FIGS. 9-12). Embodiments of the present ball valve assembly have a power stroke side and a return stroke side. A return conduit extends generally between the return stroke side and the second end of the generally cylindrical bore. The power stroke side is in fluid communication with the first end. An exhaust port extends from approximately medial of the generally cylindrical bore to the outside of the body member.

In certain embodiments, the ball valve assembly includes a valve ball element. The valve ball element is loosely confined within a valve chamber for movement between sealing engagement with a first concave generally conical surface on the power stroke side, and sealing engagement with a second concave surface on the return stroke side.

The sealing engagement between the valve ball element and the respective concave generally conical surfaces is generally in the nature of a line contact between the surface of the ball element and the respective concave generally conical surfaces. The first and second concave generally conical surfaces are generally opposed to one another to define a valve chamber therebetween. The two concave generally conical surfaces are spaced apart by a distance that is slightly greater than the diameter of the valve ball element. The valve ball element has a sealingly resilient surface composed of substantially non-magnetizable material. The substantially non-manetizable surface of the valve ball element may be organic or inorganic. In an embodiment, the loosely confined ball element is permitted at least about 0.005 inches of random lateral movement while traveling within the valve chamber generally axially between the first and second concave generally conical surfaces. The valve ball element is the only moving part in the ball valve assembly. In particular embodiments, the loosely confined valve ball element has at least about 0.005 inches of clearance within said valve chamber between said first and second conical surfaces The valve ball element may be hollow or solid, and it may be composed of the same or different materials throughout. The valve ball element is substantially spherical and free-floating within the valve chamber so that it will rotate freely and generally present a different location (generally a line) for sealing contact with the respective concave generally conical surfaces on substantially every stroke. The ball valve element is afforded a small amount of lateral movement as it moves longitudinally between the respective concave generally conical surfaces. Wear of the valve ball element is thus distributed over the entire surface, and any foreign particles or excess lubricant that gets into the ball valve assembly will be quickly dislodged by the free-floating motion of the valve ball element, or the flow of gas through the ball valve assembly, or both.

To acquaint persons skilled in the pertinent arts most closely related to the present invention, an embodiment of a ball valve assembly that illustrates a best mode now contemplated is described herein by, and with reference to, the annexed drawings that form a part of the specification. The exemplary ball valve assembly is described in detail without attempting to show all of the various forms and modifications in which the invention might be embodied. As such, the embodiments shown and described herein are illustrative, and as will become apparent to those skilled in the arts, can be modified in numerous ways, the invention being measured by the appended claims and not by the details of the specification or drawings.

There was a long standing need in continuous stroke pneumatic tools for simple control valves with a minimum of sealing surfaces that would purge themselves. Embodiments of the present invention have only three sealing surfaces (the substantially spherical surface of the ball element and the two concave generally conical surfaces in the valve chamber). The area of seal on the ball element is generally only a line of contact tangential to the respective concave generally conical surfaces. The gap between the generally spherical and concave generally conical surfaces is large enough to permit debris to be dislodged by the normal operation of the ball valve assembly. The curvatures of the two surfaces do not match (substantially spherical as against concave generally conical), thereby preventing foreign objects and moisture from getting trapped between them.

Embodiments of the valve ball element are generally non-magnetizable (Polyurethane, according to one embodiment). According to certain embodiments, the moving valve ball element itself is manufactured of a material that is stable between at least approximately −40 degrees Fahrenheit to +140 degrees Fahrenheit.

The valve ball element is free to move in more than one plane, allowing it to break any "sticking" between surfaces.

The lack of close fitting parts in embodiments allows the free flow of any oils or lubricants that may be present. In certain embodiments, the ball valve assembly itself does not require any form of lubrication. According to certain embodiments, the valve ball elements inherently exhibit high resistance to wear and have a high tensile strength.

During the operation of the tool, the valve ball elements roll and tumble, thus presenting a different wear surface every time the valve ball element moves. The contact surface area is minimal between the valve ball element and the concave generally conical surfaces, as opposed to the face to face seal typically found in conventional control valves. On the upper and lower valve seats, no heat treatment or grinding operations are required. Fewer components are required than in conventional prior art control valves.

Other objects, advantages, and novel features of embodiments of the present invention will become more fully apparent from the following detailed description of the invention when considered in conjunction with the accompanying drawings, or may be learned by the practice of embodiments of the invention as set forth herein.

BRIEF DESCRIPTION OF THE DRAWINGS

The present invention provides its benefits across a broad spectrum of pneumatic tools. While the description which follows hereinafter is meant to be representative of a number of such applications, it is not exhaustive. As those skilled in the art will recognize, the basic apparatus taught herein can be readily adapted to many uses. This specification and the claims appended hereto should be accorded a breadth in keeping with the scope and spirit of the invention being disclosed despite what might appear to be limiting language imposed by the requirements of referring to the specific examples disclosed.

Referring particularly to the drawings for the purposes of illustrating the invention and its presently understood best mode only and not limitation:

FIG. 1 is a diagrammatic cut-away perspective view of an embodiment of a ball valve assembly.

FIG. 2 depicts a diagrammatic plan view of an embodiment of a lower valve seat member. "Upper" and "lower" are used merely to identify and distinguish between the valve seats. As will be clear to those skilled in the art, the orientation of the valve seats relative to the center of the Earth is not the intended meanings of "upper" and "lower" as used herein.

FIG. 3 is a diagrammatic cross-sectional view taken along line 3-3 in FIG. 2.

FIG. 4 is a diagrammatic cross-sectional view of an embodiment with the upper and lower valve seat members assembled together with a valve ball element.

FIG. 5 is an exploded diagrammatic cross-sectional view of an embodiment with the upper and lower valve seat members assembled together with a valve ball element. The valve ball element is illustrated in engagement with a concave generally conical surface in the lower valve seat member.

FIG. 6 is an exploded diagrammatic cross-sectional view of an embodiment with the upper and lower valve seat members assembled together with a valve ball element. The valve ball element is illustrated in engagement with the concave generally conical surface in the upper valve seat member.

FIG. 7 is a diagrammatic illustration of a prior art continuous stroke pneumatic tool without a valve assembly.

FIG. 8 is an exploded diagrammatic view of the piston and tappet elements of FIG. 7.

DETAILED DESCRIPTION OF THE PREFERRED EMBODIMENTS

Figure 9:
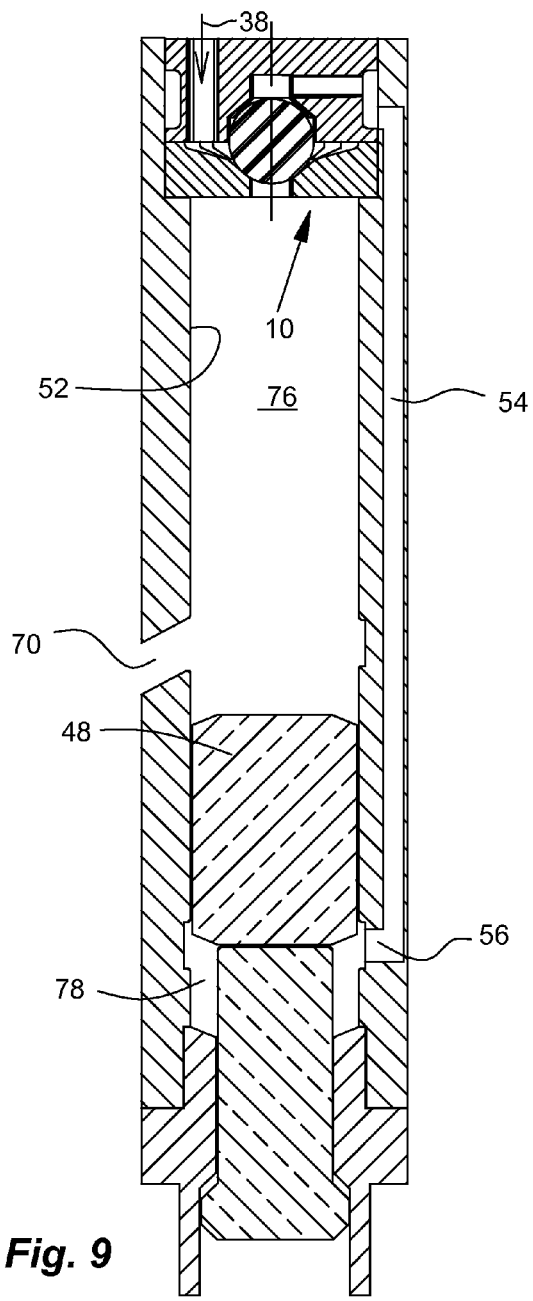
FIG. 9 is a diagrammatic illustration of a continuous stroke pneumatic tool with an embodiment of the present ball valve assembly installed in the tool. The tool shown at rest with no gas pressure applied to the pneumatic circuit.

Referring now to the drawings wherein like reference numerals designate identical or corresponding parts throughout the several views. It is to be understood that the drawings are diagrammatic and schematic representations of various embodiments, and are not to be construed as limiting in any way. The use of words and phrases herein with reference to specific embodiments is not intended to limit the meanings of such words and phrases to those specific embodiments. Words and phrases herein are intended to have their ordinary meanings, unless a specific definition is set forth at length herein.

Referring particularly to the drawings, there is illustrated generally at 10 an embodiment of a ball valve assembly. The ball valve assembly 10 includes a lower valve seat member 12, an upper valve seat member 14, and a valve ball element 16. The components of the ball valve assembly are assembled generally along a longitudinal axis 18. Lower valve seat member 12 includes a power stroke port 20, a concave generally conical surface 30, and a generally annular gas channel 34. As illustrated for example in FIGS. 1-6, the generally annular gas channel 34 circumferentially surrounds and extends general outwardly from the valve chamber. FIGS. 1 and 4 further illustrate, by way of example, the generally annular gas channel 34 being around the valve ball element and generally outward of the valve chamber. Upper valve seat member 14 includes a concave generally conical surface 32, a generally cylindrical ball retainer bore 24, and a return stroke gas outlet chamber 26 that is generally concentric with and open to concave generally conical surface 32. As illustrated for example in FIGS. 1-6, in embodiments, the power stroke port 20, concave generally conical surfaces 30 and 32, the generally cylindrical ball retainer bore 24 and the return stroke gas outlet chamber 26 may be in generally concentric alignment along the longitudinal axis 18. Exhaust channel 28 communicates between return stroke gas outlet chamber 26 and generally annular channel 36. In typical embodiments, the exhaust channel 28 extends generally radially outward of said longitudinal axis, as illustrated, for example, in FIG. 4. Exhaust channel 28 is sealed on its radially outer side by a mating generally annular counter bore 60 in a pneumatic tool as indicated generally at 42 in FIG. 7.

Gas is applied to the pneumatic circuit that ball valve assembly 10 controls via inlet channel 22. The direction of the inflowing gas flow is as indicated at 38. The diameter of generally cylindrical ball retainer bore 40 is such as to allow the valve ball element 16 to move laterally. For example, certain embodiments allow from approximately five to 100 thousandths of an inch, more or less, lateral movement of the valve ball element 16, and certain other embodiments allow from approximately 30 to 75 thousandths of an inch lateral movement. In general, there is sufficient clearance between generally cylindrical wall 24 and valve ball element 16 to permit valve ball element 16 to roll and tumble freely as it moves between the respective concave generally conical surfaces. This "purging clearance" permits the ball valve element to purge itself of foreign objects, and to present a new sealing surface every time it seats itself. This distributes wear around the entire generally spherical surface of the valve ball element 16.

In general gas under pressure, for example, 80 to 120 pounds per square inch is applied continuously to the pneumatic circuit through inlet channel 22. A valve (not shown) upstream from inlet channel 22 turns the flow of gas on and off. In embodiments, the inlet channel 22 is adapted to be in fluid communication between the generally annular gas channel 34 and the continuous source of pressurized gas. In particular embodiments, such as the one illustrated, for example, in FIG. 5, the inlet channel 22 extends generally parallel to and laterally offset from the longitudinal axis 18. The position of the valve ball element 16 determines whether the pressurized gas is applied to the power stroke or return stroke sides of an associated pneumatic tool. When valve ball element 16 is directly sealingly engaged with concave generally conical surface 30 in lower valve seat member 12, pressure is applied to the return stroke side of an associated pneumatic tool. When valve ball element 16 is directly seated against generally conical surface 32 in upper valve seat member 14, pressure is applied to the power stroke side of the pneumatic tool. When the ball valve assembly 10 is in the configuration illustrated in FIG. 4, the gas pressure is applied to the power stroke side of the pneumatic circuit.

The generally annular gas channel 34 distributes inflowing gas around the valve ball element 16, and also provides space for foreign objects to escape as they are momentarily deflected off the respective sealing surfaces. Such foreign objects are generally flushed through the pneumatic circuit within a few strokes. They generally do not accumulate in the ball valve assembly 10.

A typical continuous stroke pneumatic tool is illustrated diagrammatically at 42 (FIGS. 7-12). Its components include a barrel member 44 with an internal generally cylindrical bore 52, an annular counter bore 60 for receiving a ball valve assembly 10, a tappet element 50, a tappet element holder 46, and a piston element 48. A gas input port 62 feeds pressurized gas from an associated control valve to gas channel 54. Gas channel 54 discharges pressurized gas through port 56 into the lower end of generally cylindrical bore 52. When under pressure, gas flows through gas channel 54 in the direction indicated by arrow 72. Pressurized gas always flows through discharge port 70 in the direction indicated by arrow 74. Discharge port 70 is open to the atmosphere. Pressurized gas is discharged from the pneumatic circuit through discharge port 70 from the power stroke or return stroke side of the pneumatic circuit depending upon where piston element 48 is located in its travel within generally cylindrical bore 52. Gas is discharge from the return stroke side when piston 48 is between discharge port 70 and ball valve assembly 10. Gas is discharge from the power stroke side when piston element 48 is between discharge port 70 and tappet element 50. For convenience sake the piston is described as being "above" the discharge port when it is between the ball valve assembly 10 and the discharge port, and "below" the discharge port when it is between the discharge port and the tappet element. The "lower" end 64 (FIG. 8) of piston element 48 is adapted to repeatedly striking the "upper" end 66 of tappet element 50. The "lower" end 68 of tappet element 50 is adapted to activating a tool that is attached to the assembly. The piston and tappet elements move slidably in both directions along the longitudinal axis of the pneumatic tool as indicated by the two headed arrows that are superimposed on these components. The longitudinal axis of the pneumatic tool is generally coextensive with that 18 of ball valve assembly 10.

FIG. 9 is illustrative of the positioning of the components within ball valve assembly 10 and pneumatic tool 42 when there is no pressurized gas being supplied to the system. The valve ball element is shown resting on the seating surface of the lower valve seat member.

Figure 10:
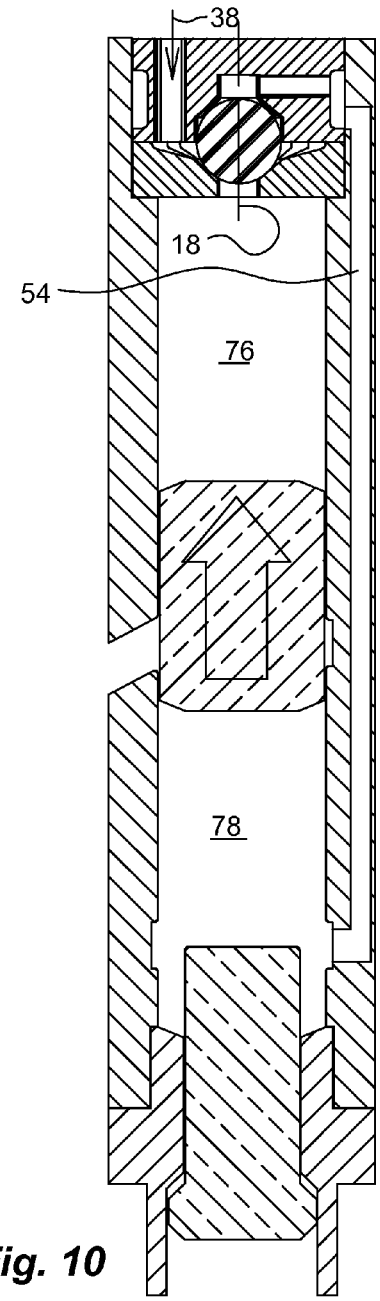
FIG. 10 is a diagrammatic illustration similar to FIG. 9. The tool shown during the return stroke with gas pressure applied to the pneumatic circuit between the tappet and piston elements.

In FIG. 10, valve ball element is shown resting on the seating surface of the lower valve seat member, however, gas under pressure is being applied to the return stroke side of the pneumatic system so that it is entering lower part 78 of generally cylindrical bore 52 through port 56. As indicated by the superimposed arrow on piston element 48, the piston is moving up towards the "upper" part 76 of generally cylindrical bore 52.

Figure 11:
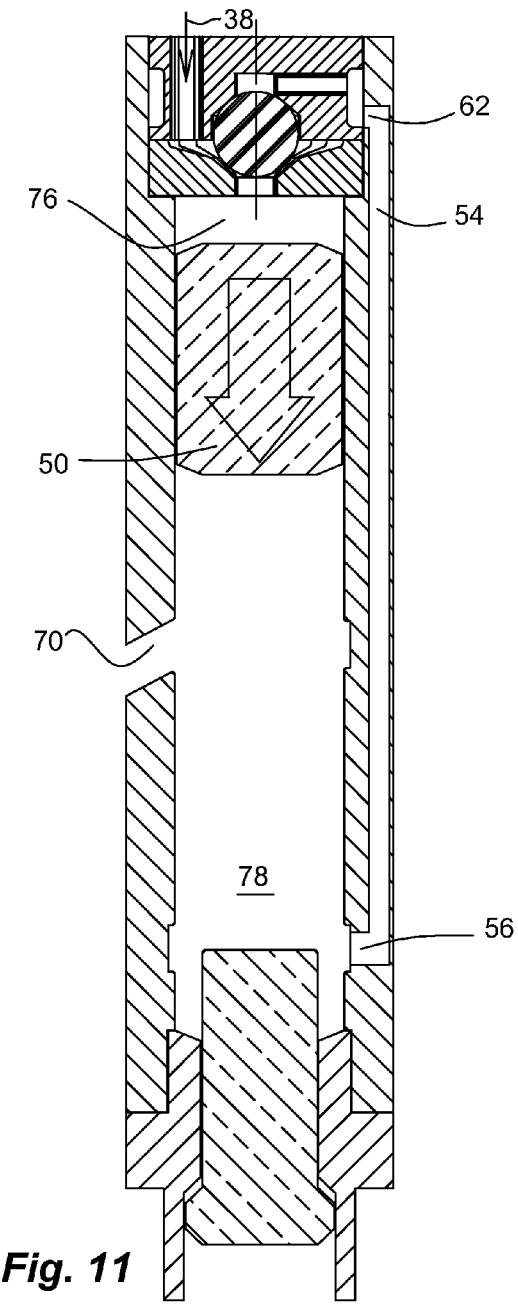
FIG. 11 is a diagrammatic illustration similar to FIG. 9. The tool is shown during the switch between the return stroke and the power stroke with the power stroke commencing as gas pressure is applied to the pneumatic circuit above the piston element.

FIG. 11 illustrates the beginning of the power stroke. The valve ball element is seated on the sealing surface in upper valve member 14, and pressurized gas is flowing into upper part 76 through power stroke port 20. The pressurized gas in lower part 78 has been exhausted through discharge port 70. As indicated by the arrow superimposed thereon, piston element 48 has stared its power stroke. At the end of this downward power stroke, piston element 48 will impact tappet element 50.

Figure 12:
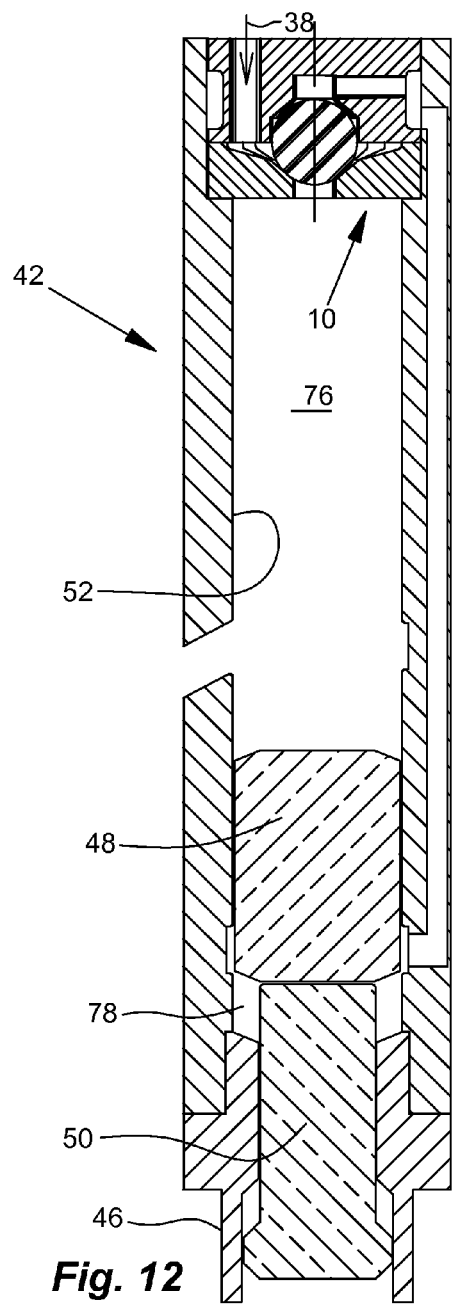
FIG. 12 is a diagrammatic illustration similar to FIG. 9. The tool is shown during the piston element hit on the tappet element at the lower end of the power stroke with gas pressure starting to be applied to the pneumatic circuit between the piston element and the tappet element.

FIG. 12 illustrates the moment of piston element hit. Piston element 48 is in lower part 78 in contact with tappet element 50. Upper part 76 has been depressurized by the exhaustion of gas through discharge port 70. The valve ball element has moved downward into contact with the sealing surface of the lower valve member.

Figure 13:
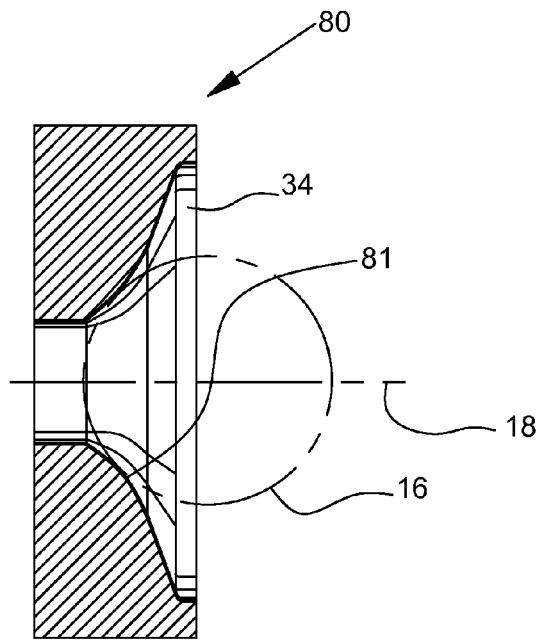
FIG. 13 is a diagrammatic cross-sectional view of an embodiment of a lower valve seat member wherein the form of the sealing surface of the concave generally conical surface is compound.

FIG. 13 illustrates generally at 80 an embodiment of a lower valve member in which the concave generally conical surface 81 is a compound surface.

Figure 14:
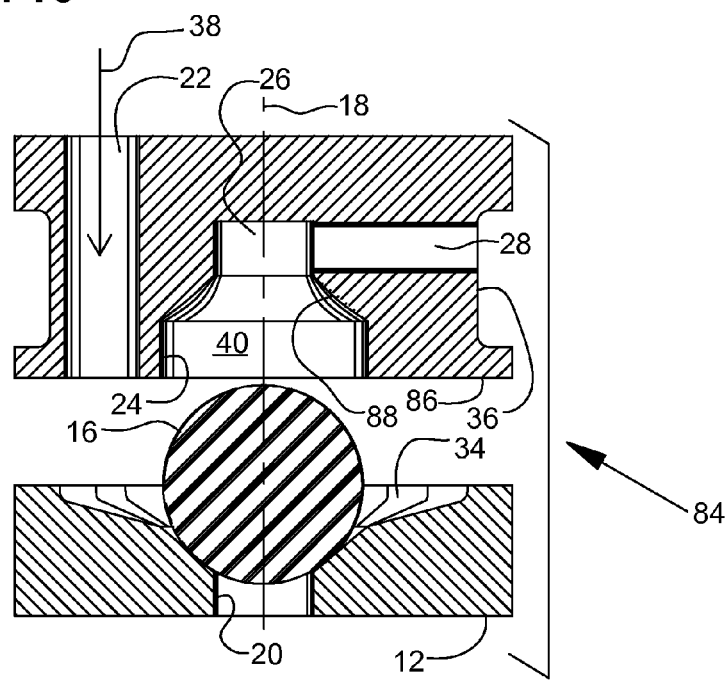
FIG. 14 is a diagrammatic cross-sectional view of an embodiment of an upper valve seat member wherein the form of the sealing surface of the concave generally conical surface is compound.

FIG. 14 illustrates generally at 84 an embodiment of an upper valve member 86 in which the concave generally conical surface 88 is a compound surface.

Many existing pneumatic tools have counterbores for mounting valve assemblies of different kinds. When constructed according to the standard dimensions of the counterbores of such pre-existing tools, embodiments of the present ball valve assemblies are suitable for use as replacement valve assemblies. The prior conventional valve assembly is removed and a suitably proportioned embodiment of the present ball valve assembly is inserted in its place. The present embodiments function as replacement kits. Embodiments comprise a non-magnetizable valve ball element confined between two appropriately ported concave generally conical surfaces. The valve ball element is generally spherical and it is the only moving part. If a valve ball element fails in service it is quick, easy, and simple to replace it. The non-moving parts of such embodiments are likewise easily replaceable.

The non-magnetizable valve ball element is generally not as dense as steel (the metal that is often used in valves). The cross-sectional area through which the gas flows within the valve assembly is generally greater than through similar sized prior valve assemblies. The freer flow of gas through embodiments of this valve assembly, combined with a quick reacting valving member generally improves the speed and impact force of pneumatic tools that previously incorporated prior valve assemblies.

The nature of the non-magnetic valve ball 16 is such that it is hard enough and resilient enough to reject the embedment of particles, yet soft enough to form a seal. In some embodiments the valve ball has a surface hardness of from approximately 70 to 120, and in further embodiments, approximately 80 to 100 Shore A hardness. Many conventional organic and inorganic polymers exhibit the characteristics of wear, fracture resistance, and durability that produce the best results when employed as the valve ball element. Conventional silicon polymers, polyurethane, polybutadiene, polyethylene, and polypropylene polymers exhibit such properties. Other such conventional organic and inorganic polymers can be found by those skilled in the art in well publicized reference works. The anticipated conditions of use should be considered in the selection of a material. Materials that fracture easily at, for example, 10 degrees Fahrenheit below zero, would not be satisfactory to use in construction equipment. Tensile strengths of at least approximately 5,000 pounds per square inch are best for most applications. For some embodiments tensile strengths should be at least approximately 6,000 pounds per square inch or higher. For general purpose use, the material from which the valve ball is constructed should be oil, abrasion, tear, impact, chemical, and electrical resistant. It should have a finish that is smooth to the touch. It should withstand temperatures of from approximately −35 to +185 degrees Fahrenheit without damage that impairs its intended function as a ball valve element.

The valve ball element should be generally spherical so that the valve ball element will not have a significant tendency to continually seal in one place, or be so distorted that it can not seal in some configurations. The valve ball element should not be so out of spherical in its shape that it will not roll and tumble as it moves between sealing surfaces. In general, variations in diameter for a one inch diameter ball of plus or minus approximately 20 to 30 thousandths of an inch are satisfactory. Such tolerances are at least one or two orders of magnitude greater than for most of the valving elements in previous valve assemblies. This alone significantly reduces the cost of the present embodiments.

The non-magnetizable valve ball elements are generally self lubricating. If the rest of a pneumatic tool is constructed of self lubricating materials, the need for lubrication can be eliminated. Running such tools without the need for any lubrication reduces significantly the maintenance costs, as well as significantly increasing the reliability of the tool.

The generally conical surfaces (whether compound or straight) of the upper and lower valve seat members should extend such that the included angles of the concave conical surfaces are from approximately 80 to 120, in some embodiments from approximately 90 to 110 degrees, and in some further embodiments from approximately 95 to 105 degrees. The generally conical surface on the upper valve seat member need not have the same included conical angle as that of the lower valve seat member. The conical surfaces should not be distorted to such a degree that they do not seal properly with the valve ball. Surfaces that are abrasive enough to rapidly wear the surface of the valve ball generally should be avoided.

The upper and lower valve seat members can be made of the same or different material, and they may be metallic or non-metallic. Where corrosion is a serious concern, non-metallic materials of construction can be used. Where organic or inorganic polymers are used the material should be dimensionally stable and fracture resistant under the anticipated conditions of use. Materials that fracture easily at, for example, 10 degrees Fahrenheit below zero, would generally not be satisfactory for use in construction equipment.

What have been described are preferred embodiments in which modifications and changes may be made without departing from the spirit and scope of the accompanying claims. It is therefore to be understood that, within the scope of the appended claims, the invention may be practiced otherwise than as specifically described.

What is claimed is:

1. In a continuous stroke pneumatic tool including:
a body member having a longitudinal axis and a generally cylindrical bore therein, said generally cylindrical bore having generally axially opposed first and second ends;
a piston element slidably received in said generally cylindrical bore for movement generally along said longitudinal axis in a power stroke towards said second end and in a return stroke toward said first end;
a tappet element mounted generally at said second end and positioned to be impacted by said piston element at approximately the end of said power stroke;
a pneumatic circuit associated with said body member, said pneumatic circuit including a supply conduit adapted to being connected to a continuous source of pressurized fluid, an on-off valve, said on-off valve being flow controllingly associated with said supply conduit, a control valve assembly mounted generally in said body member at approximately said first end, said control valve assembly having a power stroke side and a return stroke side, a return conduit extending generally between said return stroke side and said second end, said power stroke side being in fluid communication with said first end, and an exhaust port extending from approximately medial of said generally cylindrical bore to the outside of said body member;
the improvement comprising:
said control valve assembly comprising a ball valve assembly including a valve ball element, said valve ball element being substantially non-magnetizable and having a sealingly resilient surface, said valve ball element being loosely confined for at least about 0.005 inches movement between sealing engagement with a first concave generally conical surface on said power stroke side and sealing engagement with a second concave generally conical surface on said return stroke side, said first and second concave generally conical surfaces being generally opposed to one another and defining a valve chamber there between, a generally annular gas channel circumferentially surrounding and extending generally outwardly from said valve chamber, said generally annular gas channel being adapted to distribute gas from said supply conduit to said valve chamber around said valve ball element.

2. A continuous stroke pneumatic tool of claim 1 wherein said valve ball element comprises substantially organic polymeric material.

3. A continuous stroke pneumatic tool of claim 1 wherein said valve ball element comprises substantially inorganic material.

4. A continuous stroke pneumatic tool of claim 1 wherein said loosely confined valve ball element has at least about 0.005 inches to 0.100 inches of clearance within said valve chamber between said first and second conical surfaces.

5. A continuous stroke pneumatic tool of claim 1 in which said loose confinement further permits the valve ball element at least about 0.005 inches of random lateral movement while traveling within the valve chamber between said first and second concave generally conical surfaces.

6. A continuous stroke pneumatic tool of claim 1 in which said control valve assembly further comprises:
   (a) a lower valve seat member including a power stroke port, said first concave generally conical surface, and said generally annular gas channel; and
   (b) an upper valve seat member including said second concave generally conical surface and a generally cylindrical ball retainer bore.

7. A continuous stroke pneumatic tool as defined in claim 1 in which at least one of said first and second concave generally conical surfaces has a compound form.

8. A control valve replacement kit for continuous stroke pneumatic tools that include a pneumatic circuit with a power stroke side and a return stroke side, said control valve replacement kit comprising:
   a valve ball element, said valve ball element being substantially non-magnetizable and having a sealingly resilient surface, said valve ball element being loosely confined for at least about 0.005 inches movement within a valve chamber between direct sealing engagement with a first concave generally conical surface on said power stroke side and direct sealing engagement with a second concave generally conical surface on said return stroke side, said first and second concave generally conical surfaces being generally opposed to one another, a generally annular gas channel circumferentially surrounding and extending generally outwardly from said valve chamber, said generally annular gas channel being adapted to distributing inflowing gas around said valve ball element, and said control valve replacement kit being adapted to being assembled to said continuous stroke pneumatic tools in operative communication with said pneumatic circuit.

9. A control valve replacement kit according to claim 8 wherein at least one of said first and second concave generally conical surfaces has a compound form.

10. A ball valve assembly for use in controlling the movement of a piston element along a generally cylindrical bore in a continuous stroke pneumatic tool, said ball valve assembly comprising:
   (a) a longitudinal axis;
   (b) a lower valve seat member;
   (c) an upper valve seat member;
   (d) in generally concentric alignment along said longitudinal axis:
      (i) a power stroke port;
      (ii) a first concave generally conical surface in said lower valve seat member;
      (iii) a second concave generally conical surface in said upper valve seat member;
      (iv) a generally cylindrical ball retainer bore; and
      (v) a return stroke gas outlet chamber; and
   (e) a valve ball element being substantially non-magnetizable and having a sealingly resilient surface, said first and second concave generally conical surfaces being generally opposed to one another and defining a valve chamber there between with said valve ball element therein, a generally annular gas channel circumferentially surrounding and extending generally outwardly from said valve chamber, said generally annular gas channel being adapted to distributing gas around said valve ball element, said valve ball element being loosely confined within said valve chamber for:
      (i) at least about 0.005 inches of movement between sealing engagement with said first concave generally conical surface and sealing engagement with said second concave generally conical surface; and
      (ii) at least about 0.005 inches of random lateral movement while traveling between sealing engagement with said first concave generally conical surface and sealing engagement with said second concave generally conical surface.

11. A ball valve assembly as defined in claim 10 in which said upper valve seat member further includes:
   (a) an inlet channel adapted to be in fluid communication between said generally annular gas channel and a continuous source of pressurized fluid; and
   (b) an exhaust channel adapted to be in fluid communication between said return stroke gas outlet chamber and a return conduit.

12. A ball valve assembly as defined in claim 10 wherein said valve ball element comprises substantially organic polymeric material.

13. A ball valve assembly as defined in claim 10 wherein said valve ball element comprises substantially inorganic material.

* * * * *